(12) United States Patent
Watanabe et al.

(10) Patent No.: US 9,684,137 B2
(45) Date of Patent: Jun. 20, 2017

(54) OPTICAL CONNECTOR FERRULE

(71) Applicant: SANWA DENKI KOGYO CO., LTD., Tokyo (JP)

(72) Inventors: Yasuhiro Watanabe, Tokyo (JP); Atsushi Nishio, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 15/099,638

(22) Filed: Apr. 15, 2016

(65) Prior Publication Data

US 2016/0320570 A1    Nov. 3, 2016

(30) Foreign Application Priority Data

Apr. 30, 2015 (JP) ................. 2015-092871

(51) Int. Cl.
*G02B 6/38* (2006.01)
*G02B 6/36* (2006.01)

(52) U.S. Cl.
CPC .......... *G02B 6/3861* (2013.01); *G02B 6/3632* (2013.01); *G02B 6/3834* (2013.01); *G02B 6/3885* (2013.01)

(58) Field of Classification Search
CPC ................................. G02B 6/38; G02B 6/3861
USPC ........................................................ 385/80
See application file for complete search history.

(56) References Cited

U.S. PATENT DOCUMENTS

| | | | |
|---|---|---|---|
| 4,952,263 A | | 8/1990 | Kakii et al. |
| 5,420,952 A | * | 5/1995 | Katsura et al. ................. 385/80 |
| 5,815,621 A | * | 9/1998 | Sakai et al. ..................... 385/80 |
| 5,907,651 A | | 5/1999 | Bunin et al. |
| 6,409,394 B1 | * | 6/2002 | Ueda et al. ..................... 385/80 |
| 6,817,777 B1 | | 11/2004 | Grabbe |
| 2001/0007603 A1 | * | 7/2001 | Sakurai et al. ................. 385/60 |
| 2001/0036341 A1 | * | 11/2001 | Ohtsuka et al. ................ 385/78 |
| 2002/0176670 A1 | * | 11/2002 | Shinoda et al. ................ 385/80 |
| 2004/0161205 A1 | * | 8/2004 | Hengelmolen et al. ........ 385/78 |

(Continued)

FOREIGN PATENT DOCUMENTS

| | | |
|---|---|---|
| EP | 1039324 A1 | 9/2000 |
| JP | H0954224 A | 2/1997 |

(Continued)

OTHER PUBLICATIONS

Extended European Search Report dated Jul. 11, 2016, for EP 16166545.0.

*Primary Examiner* — Kaveh C Kianni
(74) *Attorney, Agent, or Firm* — Bacon & Thomas, PLLC

(57) ABSTRACT

Adhesive reservoirs having shapes of stepped grooves are provided at corners in outer edges of an opening of an insertion opening portion having a shape of a rectangular opening of a main body of the ferrule which is formed by consecutively installing the insertion opening portion provided on a rear end side such that a boot having substantially a shape of a square tube and having an optical fiber core wire at a distal end is inserted and supported, and optical fiber core wire insertion holes provided on a front end side such that a side of a distal end portion of the optical fiber core wire is inserted into a deep portion of the insertion opening portion and the distal end portion is exposed outwardly. In this way, an adhesive is prevented from leaking out from a gap between the boot and the insertion opening portion.

5 Claims, 6 Drawing Sheets

(56) References Cited

U.S. PATENT DOCUMENTS

| | | | | |
|---|---|---|---|---|
| 2005/0123248 A1* | 6/2005 | Sakurai et al. | | 385/78 |
| 2005/0213893 A1* | 9/2005 | Hamasaki et al. | | 385/80 |
| 2006/0245694 A1* | 11/2006 | Chen et al. | | 385/71 |
| 2010/0067852 A1 | 3/2010 | Dangel et al. | | |
| 2011/0317959 A1* | 12/2011 | Ohta et al. | | 385/38 |
| 2015/0110493 A1* | 4/2015 | Khor et al. | | 398/88 |

FOREIGN PATENT DOCUMENTS

| | | |
|---|---|---|
| JP | 2001083367 A | 3/2001 |
| JP | 2001324650 A | 11/2001 |
| JP | 2008292836 A | 12/2008 |

\* cited by examiner

OPTICAL CONNECTOR FERRULE

FIELD OF THE RELATED ART

The present invention relates to an optical connector ferrule for forming a multi-core batch connector such as a mechanically-transferable-splicing-connector (hereinafter referred to as an MT connector) and multifiber-push-on (hereinafter referred to as an MPO connector) used for connection to an optical fiber core wire and an optical fiber tape core wire.

BACKGROUND OF THE RELATED ART

In the past, with development of a high-density multi-core cable that stores a single mode optical fiber tape of, for example, four cores, eight cores, and twelve cores, a multi-core batch connector capable of efficiently connecting an optical fiber at a high density has been used as a connector for collectively connecting an SM-type optical fiber single-core wire and a tape core wire with low loss. This connection scheme is a scheme in which ferrules formed by positioning and fixing a multi-core optical fiber are aligned and fitted to each other by two guide pins. The connector is applicable to high-speed mechanical switching in addition to batch connection of the optical fiber tape, and thus is referred to as an MT connector. Recently, the connector has been put to practical use as a connector for connection of an optical fiber tape of four cores, eight cores, and twelve cores of a multi-core cable of an access system.

In addition, recently, an MPO connector, which is easily attached and detached by a push-pull operation, has been put to practical use as a batch connector of multiple cores of 24 cores and 72 cores for connection of a super-multi-core cable.

Specifically, as disclosed in Patent Document 1, it is known that an MT connector or a so-called MPO connector, in which a connection surface is tilted and polished and an optical fiber slightly protrudes, is used as a multi-core connector, a reinforcement member is embedded in a longitudinal direction of a main body of a ferrule, and the main body of the ferrule is prevented from bending in the longitudinal direction by the reinforcement member.

In addition, as disclosed in Patent Document 2, it is known that a ferrule of an optical connector using a scheme, in which a fiber hole is present in a front end portion and positioning is performed with respect to a ferrule on the other side by a fitting pin inserted into a guide pin hole, is formed by combining a connection end portion corresponding to a component including the fiber hole and the guide pin hole with a main body rear portion corresponding to a component other than the connection end portion.

As illustrated in FIG. 6(a) and FIG. 6(b), each of the above-described connectors of Patent Document 1 and Patent Document 2 includes an adhesive filling window 101 on an upper surface of a main body 100 of a ferrule, a pair of right and left guide pin insertion holes 102 for positioning penetrating through the main body 100 of the ferrule from a front end surface to a rear end surface, and a plurality of optical fiber core wire insertion holes 103 arranged in parallel between both the guide pin insertion holes 102 on the front end surface. Further, the connector includes an insertion opening portion 104 for insertion and support of a boot (not illustrated) on the rear end surface of the main body 100 of the ferrule, and a flange 105 extruding outward from an outer peripheral surface of the main body 100 of the ferrule on a rear end side of the main body 100 of the ferrule.

PRIOR ART DOCUMENTS

Patent Documents

Patent Document 1: JP 9-54224 A
Patent Document 2: JP 2001-83367 A

SUMMARY OF THE INVENTION

Problem to be Solved by the Invention

Incidentally, Patent Document 1 and Patent Document 2 have a common configuration in which a strong adhesive such as an epoxy resin-based adhesive is injected into the main body 100 of the ferrule from the adhesive filling window 101 at the time of assembly to block up and harden the window 101. However, in this case, there is concern that the adhesive may leak out from a gap between the insertion opening portion 104 on the rear end surface of the main body 100 of the ferrule and an outer wall of the boot inserted into the insertion opening portion 104.

There is concern about an influence of a leakage of the adhesive. For example, when another component (not illustrated) is attached to a portion in which the adhesive leaks and hardens, there is concern that a gap corresponding to a thickness of a protruding adhesive may be generated between the main body 100 of the ferrule and the other component. In addition, there is concern that the leaking adhesive may penetrate through the pair of right and left guide pin insertion holes 102 and harden, and thus the guide pin insertion holes 102 may be blocked up.

In this regard, the invention has been conceived in view of the above-mentioned circumstances so far, and an object of the invention is to provide an optical connector ferrule having a configuration capable of preventing an adhesive that fills a main body of the ferrule from leaking out from a gap between a boot inserted into an insertion opening portion and the insertion opening portion in advance.

Means for Solving Problem

To solve the above-mentioned problem, according to the invention, adhesive reservoirs having shapes of stepped grooves are provided at corners in outer edges of an opening of an insertion opening portion having a shape of a rectangular opening of a main body of the ferrule, which is formed by consecutively installing the insertion opening portion provided on a rear end side such that a boot having substantially a shape of a square tube and having an optical fiber core wire at a distal end is inserted and supported, and optical fiber core wire insertion holes provided on a front end side such that a side of a distal end portion of the optical fiber core wire is inserted into a deep portion of the insertion opening portion and the distal end portion is exposed outwardly.

An adhesive filling window is formed on an upper surface of the main body of the ferrule to fix the optical fiber core wire from a side of the deep portion of the insertion opening portion to a side of each rear end opening of the optical fiber core wire insertion holes by filling an adhesive therein, and the adhesive reservoirs are formed to store an adhesive injected from the adhesive filling window and leaking out from a gap between the boot and the insertion opening portion.

The main body of the ferrule includes a pair of right and left positioning guide pin insertion holes penetrating through the main body from a front surface to a rear surface thereof, a plurality of the optical fiber core wire insertion holes are arranged in parallel between both the guide pin insertion holes on the front surface, and the adhesive reservoirs on the rear surface are formed in the shapes of the stepped grooves at the corners in the outer edges of the opening of the insertion opening portion to avoid the pair of the right and left positioning guide pin insertion holes.

Effect of the Invention

According to the invention, it is possible to prevent an adhesive filling a main body inside of a ferrule from leaking out from a gap between a boot inserted into an insertion opening portion and the insertion opening portion in advance.

In other words, since adhesive reservoirs having shapes of stepped grooves are provided at corners in outer edges of an opening of an insertion opening portion having a shape of a rectangular opening of a main body of the ferrule, which is formed by consecutively installing the insertion opening portion provided on a rear end side such that a boot having substantially a shape of a square tube and having an optical fiber core wire at a distal end is inserted and supported, and optical fiber core wire insertion holes provided on a front end side such that a side of a distal end portion of the optical fiber core wire is inserted into a deep portion of the insertion opening portion and the distal end portion is exposed outwardly, even when an adhesive filling the main body inside of the ferrule leaks out from a gap between the boot and the insertion opening portion, it is possible to store the adhesive in the adhesive reservoirs in the corners in advance.

In this way, for example, even when the adhesive leaks out from the gap between the boot and the insertion opening portion, the adhesive is received in the adhesive reservoirs in the corners, and so it is possible to prevent a gap corresponding to a thickness of a protruding adhesive from being generated between the main body of the ferrule and another component when the other component is attached to a side of the insertion opening portion of the main body of the ferrule as in the past. Furthermore, the presence of the adhesive reservoirs may prevent the leaking adhesive from penetrating through the pair of right and left guide pin insertion holes in advance.

In addition, an adhesive filling window is formed on an upper surface of the main body of the ferrule to fix the optical fiber core wire from a side of the deep portion of the insertion opening portion to a side of each rear end opening of the optical fiber core wire insertion holes by filling an adhesive therein, and the adhesive reservoirs are formed to store an adhesive injected from the adhesive filling window and leaking out from a gap between the boot and the insertion opening portion. Thus, even when the adhesive injected from the adhesive filling window leaks out from the gap between the boot and the insertion opening portion, the adhesive may be stored in the adhesive reservoirs in advance.

Further, the main body of the ferrule includes a pair of right and left positioning guide pin insertion holes penetrating through the main body from a front surface to a rear surface thereof, a plurality of the optical fiber core wire insertion holes are arranged in parallel between both the guide pin insertion holes on the front surface, and the adhesive reservoirs on the rear surface are formed in the shapes of the stepped grooves at the corners in the outer edges of the opening of the insertion opening portion to avoid the pair of the right and left positioning guide pin insertion holes. Thus, the presence of the adhesive reservoirs may prevent the leaking adhesive from penetrating through the pair of right and left guide pin insertion holes in advance.

DESCRIPTION OF THE EMBODIMENTS

The embodiments of the invention will be described in detail with reference to the accompanying drawings.

In the present embodiment, an optical connector ferrule for forming a multi-core batch connector according to the invention includes a main body 10 of a ferrule which is resin-molded in a shape of a substantially rectangular case and is used as a multi-core batch MT connector capable of connecting a high-density multi-core cable that stores a single mode optical fiber tape T of twelve cores. This connection scheme is a scheme in which the main bodies 10 of the ferrules formed by positioning and fixing a multi-core optical fiber are aligned and fitted to each other by two guide pins.

A description below relates to the MT connector according to the above description. However, the invention is not limited thereto and is applicable to an MT connector for connection of a high-density multi-core cable that stores the single mode optical fiber tape T of, for example, four cores and eight cores and to a multi-core batch connector such as an MPO connector, which can be easily attached and detached by a push-pull operation, as a batch connector of sixteen cores, eighty cores, and the like for connection of a super-multi-core cable.

Figure 1A:
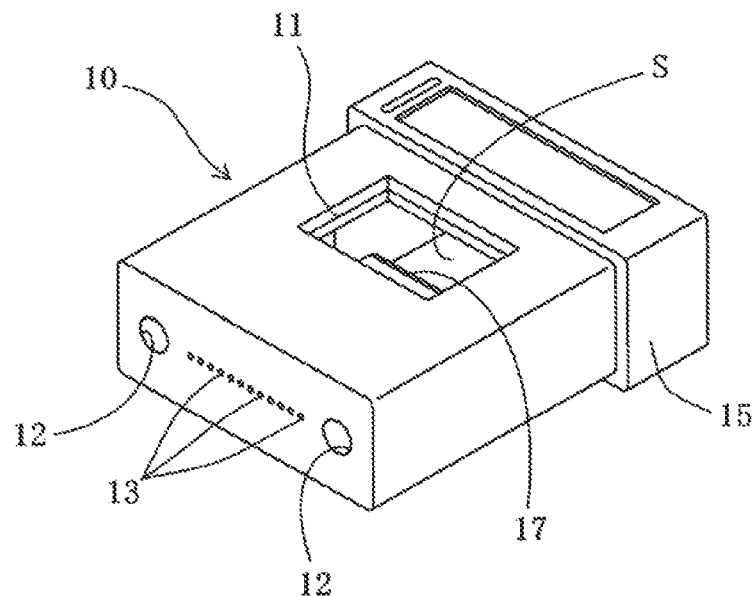
FIG. 1(a) is a perspective view of an optical connector ferrule according to an embodiment of the invention when obliquely seen from a front side.
Figure 1B:
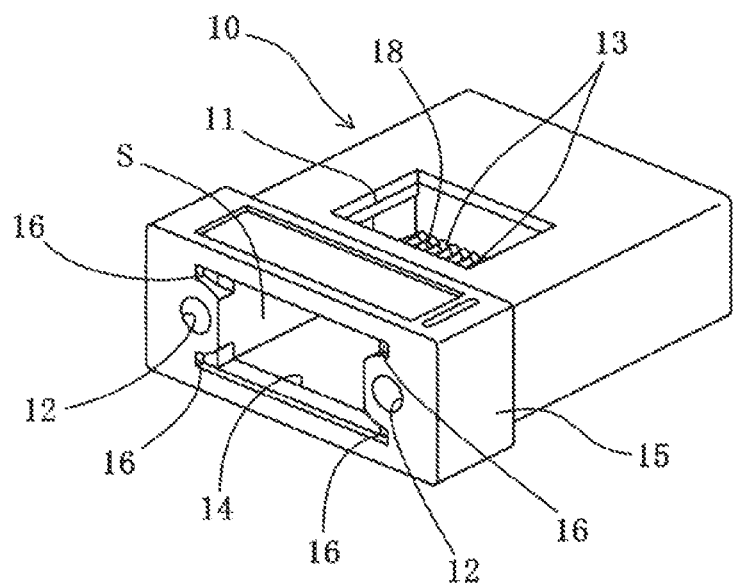
FIG. 1(b) is a perspective view of the optical connector ferrule when obliquely seen from a rear side.

A specific configuration of the main body 10 of the ferrule will be described. As illustrated in FIGS. 1(a) and 1(b), FIG.

Figure 3A:
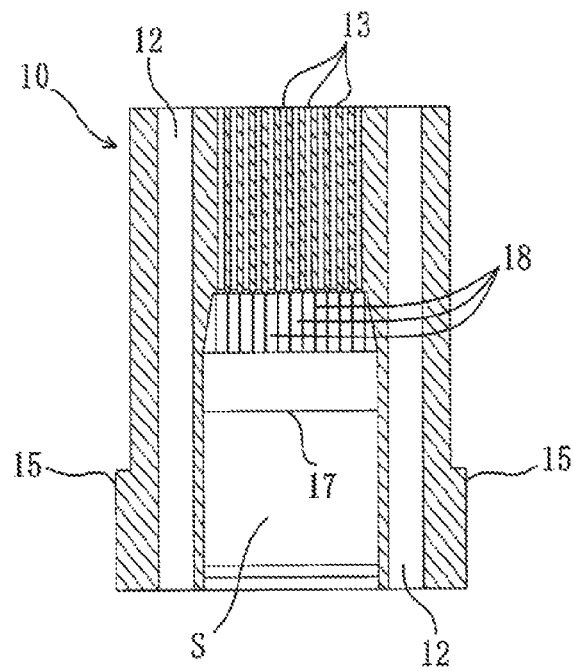
FIG. 3(a) is a cross-sectional view of the optical connector ferrule taken along line A-A of FIG. 2(c)
Figure 3B:
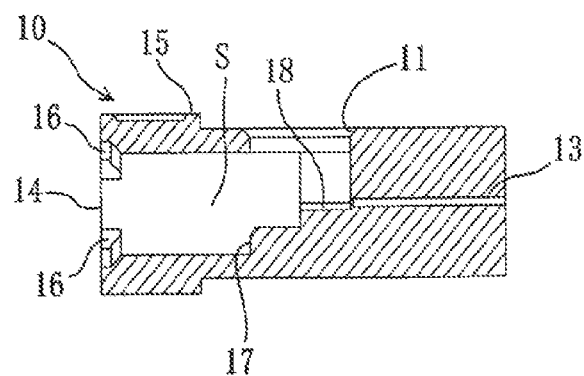
FIG. 3(b) is a cross-sectional view of the optical connector ferrule taken along line B-B of FIG. 2(b)
Figure 3C:
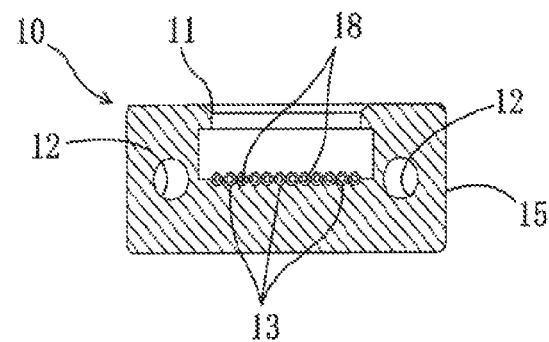
FIG. 3(c) is a cross-sectional view of the optical connector ferrule taken along line C-C of FIG. 2(b)

2, and FIG. 3, an insertion opening portion 14 having a shape of a rectangular opening is formed on a side of a rear end surface of the main body 10 of the ferrule to mount a boot B (see FIG. 4 and FIG. 5) having a shape of a substantially square tube into which the single mode optical fiber tape T formed by bunching an optical fiber core wire F of twelve cores in a shape of a tape is inserted and fixed. An inside of the main body 10 of the ferrule is configured as a storage space S of the boot B such that a portion (about a half) of a front end side of the boot B is received through the insertion opening portion 14.

Figure 2A:
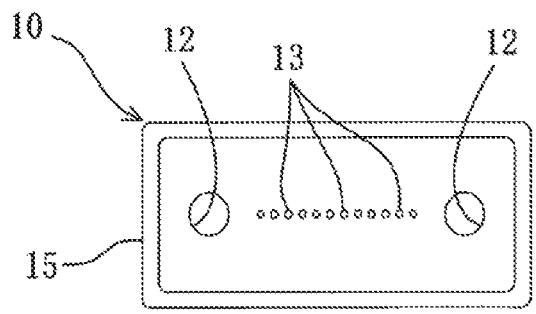
FIG. 2(a) is a front view of the optical connector ferrule.
Figure 2B:
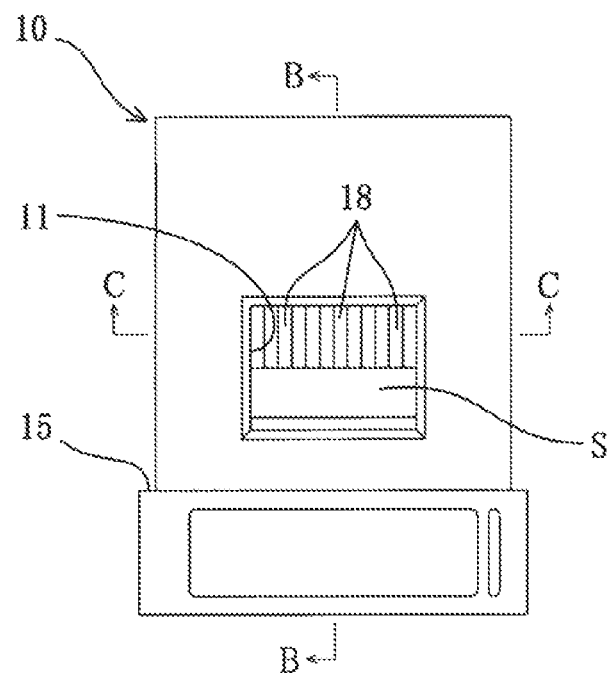
FIG. 2(b) is a plan view of the optical connector ferrule.
Figure 2C:
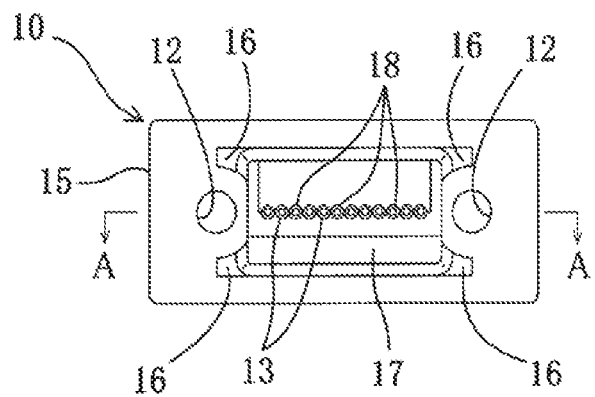
FIG. 2(c) is a rear view of the optical connector ferrule.

In addition, as illustrated in FIG. 1(*a*) and FIG. 2(*a*), on a side of a front end surface of the main body 10 of the ferrule, optical fiber core wire insertion holes 13 having shapes of twelve stomas are pierced up to a position of a deep portion of the insertion opening portion 14 (inner wall of a forward end of the storage space S of the boot B). In this way, each of the optical fiber core wire insertion holes 13 communicates with the storage space S of the boot B.

In an example illustrated in drawings (see FIG. 1(*a*), FIG. 2(*c*), FIG. 3(*a*), FIG. 3(*b*), FIG. 5, and the like), a step portion 17 is provided at a front position of the deep portion of the storage space S to face a rear edge position of an adhesive filling window 11 to be described below. A lower portion side of an apical surface of the inserted boot B is stopped in an engaged state in front of the adhesive filling window 11 by the step portion 17. In this instance, respective distal end portion sides of the optical fiber core wire F of twelve cores extruding from a distal end side of the single mode optical fiber tape T are inserted into the twelve optical fiber core wire insertion holes 13 from an inner side of the storage space S of the boot B such that an end surface of the distal end portion is exposed to a front surface side of the main body 10 of the ferrule.

Figure 5:
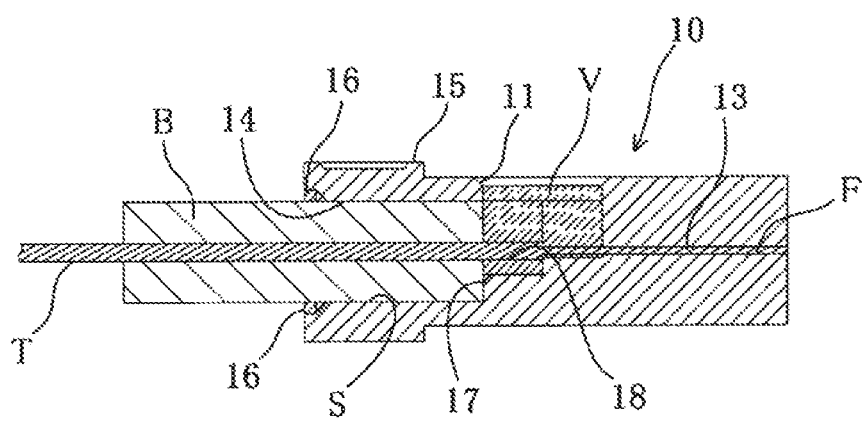
FIG. 5 is a longitudinal cross-sectional view in the center of FIG. 4(a)
Figure 6A:
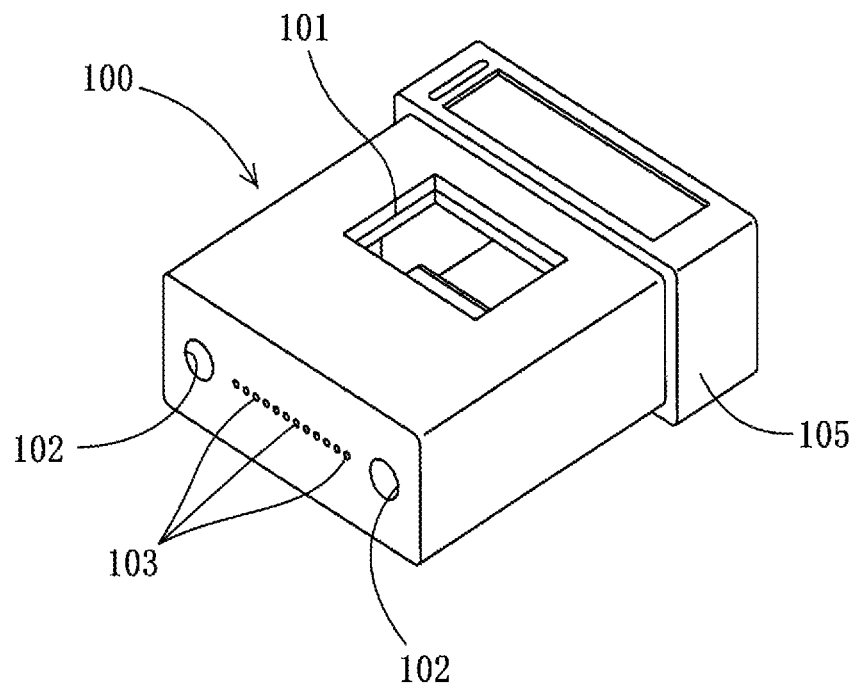
FIG. 6(a) is a perspective view of an optical connector ferrule according to an example of the related prior art when obliquely seen from a front side.
Figure 6B:
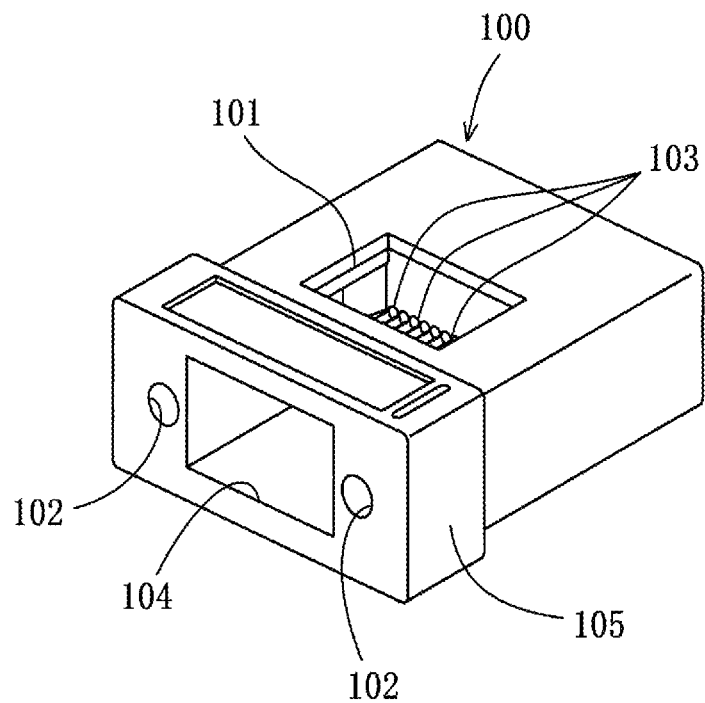
FIG. 6(b) is a perspective view of the optical connector ferrule when obliquely seen from a rear side.

That is, the adhesive filling window 11 having a shape of a substantially rectangular opening is formed substantially in the center of an upper surface of the main body 10 of the ferrule such that an upper half of the main body 10 of the ferrule is hollowed out from a side of the deep portion of the insertion opening portion 14 (the inner wall of the forward end of the storage space S of the boot B) to a side of each rear end opening of the twelve optical fiber core wire insertion holes 13, and a total of twelve U-shaped guide grooves 18 are formed from each rear end opening of the optical fiber core wire insertion holes 13 to a position facing substantially a middle of the adhesive filling window 11 (see FIG. 1(*b*), FIG. 2(*b*), FIG. 2(*c*), FIGS. 3(*a*) to 3(*c*), FIG. 5, and the like).

Referring to FIG. 1(*b*), the side of each rear end opening of the optical fiber core wire insertion holes 13 and the U-shaped guide grooves 18 are viewed through the adhesive filling window 11. For example, when an epoxy resin-based adhesive V is injected from the adhesive filling window 11 in a state in which the boot B is mounted in the insertion opening portion 14 and each distal end portion side of the optical fiber core wire F is inserted into each of the optical fiber core wire insertion holes 13, the optical fiber core wire F, for example, each of root portions of the optical fiber core wire F of twelve cores extruding from the distal end side of the single mode optical fiber tape T is fixedly installed in the main body 10 of the ferrule.

In addition, as illustrated in FIG. 1(*a*), FIG. 1(*b*), FIG. 2(*a*), FIG. 2(*c*), FIG. 3(*a*), FIG. 3(*c*), and the like, a pair of right and left guide pin insertion holes 12 for positioning penetrates through the main body 10 of the ferrule from the front end surface to the rear end surface, and the twelve optical fiber core wire insertion holes 13 on the front end surface of the main body 10 of the ferrule are arranged side by side in a row between both the guide pin insertion holes 12.

Figure 4A:
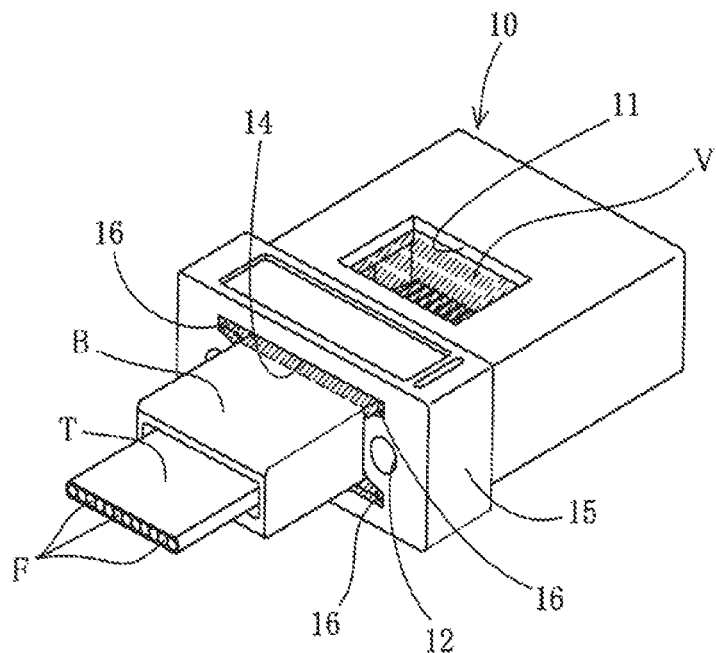
FIG. 4(a) is a perspective view illustrating an assembled and used state of the optical connector ferrule when obliquely seen from the rear side.
Figure 4B:
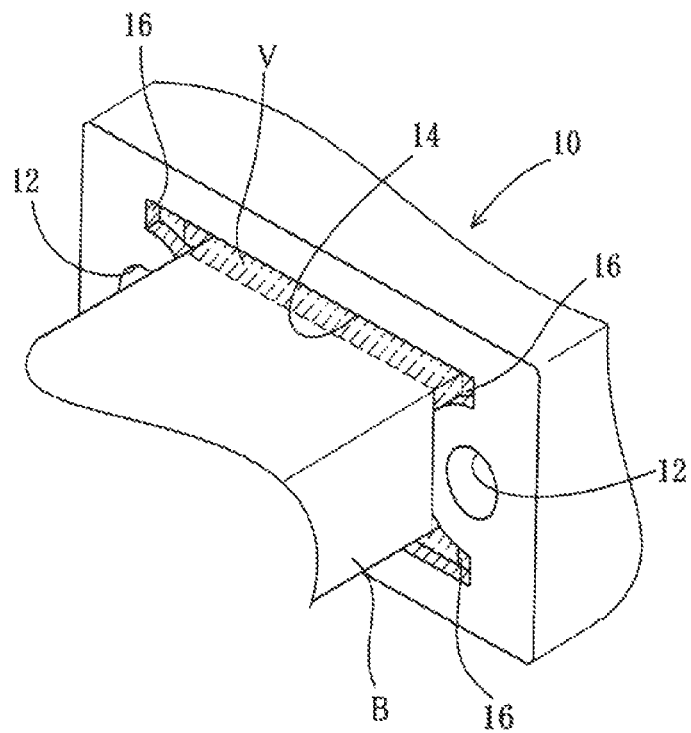
FIG. 4(b) is an enlarged perspective view illustrating a main portion of an insertion opening portion into which a boot is inserted in the assembled and used state.

As illustrated in FIG. 1(*a*), FIG. 1(*b*), FIG. 2(*b*), FIG. 3(*a*), FIG. 4(*a*), and the like, a flange 15 extruding outward from an outer peripheral surface of the main body 10 of the ferrule is provided on a rear end side of the main body 10 of the ferrule.

A main portion of the invention will be described. Adhesive reservoirs 16, each of which has a shape of a stepped groove, are provided at corners (four corners of outer edges of a rectangular opening to be described below) in outer edges of an opening of the insertion opening portion 14 to retain the adhesive V which leaks out of a gap between the boot B and the insertion opening portion 14 when the adhesive V is injected from the adhesive filling window 11. An effective area that facilitates formation of the adhesive reservoirs 16 is retained at the corners in the outer edges of the opening of the insertion opening portion 14. Thus, processing is easier when compared to a case in which the adhesive reservoirs 16 are formed in a shape of a gutter along the outer edges of the opening of the insertion opening portion 14.

In other words, as illustrated in FIG. 1(*b*), FIG. 2(*c*), FIG. 3(*b*), FIG. 4(*a*), FIG. 4(*b*), FIG. 5, and the like, the adhesive reservoirs 16 are formed sideways to be stepped grooves at four places corresponding to the corners of the outer edges of the rectangular opening of the insertion opening portion 14, for example, symmetrical positions on an upper edge side and symmetrical positions on a lower edge side while avoiding the pair of right and left positioning guide pin insertion holes 12 formed on the side of the rear end surface of the main body 10 of the ferrule. In this way, the adhesive V leaking out of the gap between the boot B and the insertion opening portion 14 is retained at four corners of the outer edges of the opening. At the same time, the leaking adhesive V may be prevented from penetrating through the pair of right and left guide pin insertion holes 12 in advance.

Next, a description will be given of an example of assembly and use with regard to an embodiment configured as described above. As illustrated in FIG. 4(*a*), FIG. 4(*b*), and FIG. 5, the boot B, in which the single mode optical fiber tape T formed by bunching the optical fiber core wire F of twelve cores in the shape of the tape is mounted, is inserted into the insertion opening portion 14 of the main body 10 of the ferrule. In this instance, the lower portion side of the apical surface of the inserted boot B is stopped in an engaged state in front of the adhesive filling window 11 by the step portion 17 inside the storage space S. At the same time, each distal end portion side of the optical fiber core wire F of twelve cores on the distal end side of the single mode optical fiber tape T is inserted into each of the twelve optical fiber core wire insertion holes 13 along the U-shaped guide grooves 18, and the end surface of the distal end portion is exposed to the front surface side of the main body 10 of the ferrule.

Next, when the adhesive V is injected from the adhesive filling window 11, each of the root portions of the optical fiber core wire F of twelve cores extruding from the distal end side of the single mode optical fiber tape T is bonded to and integrated with the main body 10 of the ferrule. In this way, a distal end portion of the single mode optical fiber tape T and the root portions of the optical fiber core wire F extruding from the distal end portion are firmly fixed by the adhesive V.

Even if the adhesive V leaks out of the gap between the boot B and the insertion opening portion 14 when the adhesive V is injected from the adhesive filling window 11, the adhesive V is retained at positions of the adhesive reservoirs 16 located at corners of the insertion opening portion 14. In this way, the leaking adhesive V is prevented from penetrating through the pair of right and left guide pin insertion holes 12.

Description has been given only of the MT connector so far. However, the invention is applicable to a multi-core optical connector of another form.

DESCRIPTION OF REFERENCE NUMERAL

B boot
V adhesive
T single mode optical fiber tape
F optical fiber core wire
S storage space
10 main body of ferrule
11 adhesive filling window
12 guide pin insertion holes
13 optical fiber core wire insertion holes
14 insertion opening portion
15 flange
16 adhesive reservoirs
17 step portion
18 guide grooves

The invention claimed is:

1. An optical connector ferrule comprising
adhesive reservoirs having shapes of stepped grooves provided at corners in outer edges of an opening of an insertion opening portion having a shape of a rectangular opening of a main body of the ferrule,
wherein the main body of the ferrule is formed by having:
the insertion opening portion provided on a rear end side of the main body of the ferrule such that a boot having substantially a shape of a square tube and having an optical fiber core wire at a distal end is able to be inserted and supported in the insertion opening, and
optical fiber core wire insertion holes provided on a front end side of the main body of the ferrule such that a side of a distal end portion of the optical fiber core wire is inserted into a deep portion of the insertion opening portion and the distal end portion is exposed outwardly, and
an adhesive filling window formed on an upper surface of the main body of the ferrule to fix the optical fiber core wire from a side of the deep portion of the insertion opening portion to a side of each rear end opening of the optical fiber core wire insertion holes by filling an adhesive therein,
wherein the adhesive reservoirs are formed to store an adhesive injected from the adhesive filling window and leaking out from a gap between the boot and the insertion opening portion.

2. The optical connector ferrule according to claim 1, wherein the main body of the ferrule includes a pair of right and left positioning guide pin insertion holes penetrating through the main body from a front surface to a rear surface thereof,
wherein a plurality of the optical fiber core wire insertion holes are arranged in parallel between both the guide pin insertion holes on the front surface, and
the adhesive reservoirs on the rear surface are formed in the shapes of the stepped grooves at the corners in the outer edges of the opening of the insertion opening portion to avoid the pair of the right and left positioning guide pin insertion holes.

3. The optical connector ferrule according to claim 1, wherein the optical fiber core insertion holes have shapes of multiple stomas.

4. The optical connector ferrule according to claim 1, further comprising a step portion provided at a front portion of the deep portion of the insertion opening portion to face a rear edge position of the adhesive filling window and configured to stop the insertion of the boot in front of the adhesive filling window.

5. The optical connector ferrule according to claim 1, further comprising U-shaped guide grooves formed from each rear end opening of the optical fiber core wire insertion holes to a position in a middle of the adhesive filling window.

* * * * *